(12) United States Patent
Codatto

(10) Patent No.: US 11,167,336 B2
(45) Date of Patent: Nov. 9, 2021

(54) ACTUATING DEVICE FOR UPPER SHEET-PRESSING TOOLS OF AN INDUSTRIAL MACHINE FOR THE BENDING OF METAL ELEMENTS

(71) Applicant: BYSTRONIC LASER AG, Niederoenz (CH)

(72) Inventor: Antonio Codatto, Cologna Veneta (IT)

(73) Assignee: BYSTRONIC LASER AG, Niederoenz (CH)

( * ) Notice: Subject to any disclaimer, the term of this patent is extended or adjusted under 35 U.S.C. 154(b) by 73 days.

(21) Appl. No.: 16/720,578

(22) Filed: Dec. 19, 2019

(65) Prior Publication Data

US 2020/0197995 A1    Jun. 25, 2020

(51) Int. Cl.
*B21D 22/02* (2006.01)
*F16H 55/00* (2006.01)
*F16H 55/26* (2006.01)
*B21D 11/20* (2006.01)

(52) U.S. Cl.
CPC .............. *B21D 22/02* (2013.01); *B21D 11/20* (2013.01); *F16H 55/00* (2013.01); *F16H 55/26* (2013.01)

(58) Field of Classification Search
CPC ........ B21D 22/02; B21D 11/20; B21D 5/047; B21D 5/04; B21D 5/004; B21D 5/006; F16H 55/26; F16H 55/00
See application file for complete search history.

(56) References Cited

U.S. PATENT DOCUMENTS

| | | | | |
|---|---|---|---|---|
| 227,804 A | * | 5/1880 | Martyn | B21D 5/04 |
| 2,343,082 A | * | 2/1944 | Proctor | B21K 7/02 |
| | | | | 72/206 |
| 5,313,814 A | * | 5/1994 | Yamamoto | B21D 5/047 |
| | | | | 72/319 |
| 5,868,024 A | * | 2/1999 | Codatto | B21D 5/04 |
| | | | | 72/323 |
| 5,934,134 A | * | 8/1999 | Codatto | B21D 5/04 |
| | | | | 72/319 |
| 2003/0172790 A1 | * | 9/2003 | Schmidt | B21D 28/02 |
| | | | | 83/523 |
| 2011/0232405 A1 | * | 9/2011 | Morin | F16H 55/26 |
| | | | | 74/417 |

FOREIGN PATENT DOCUMENTS

EP        3670015 A1 *  6/2020  ............. B21D 22/02
WO   WO 2016165914 A1 * 10/2016

* cited by examiner

*Primary Examiner* — Vinh Luong

(74) *Attorney, Agent, or Firm* — Jacob Eisenberg

(57) ABSTRACT

An actuating device for actuating a contractible element for a bending element of an industrial machine for bending metal elements comprises a lower component and an upper component apt to move relative to each other from a first position to a second position, the actuation device including a connecting plate configured to be connected to the lower component of the contractible element. A rack and pinion gear unit is also set out and includes a pinion having an axis, at least a first rack and a second rack actuated simultaneously by the pinion. The first rack is configured to be fixed to the upper component and the second rack is configured to be coupled to the connecting plate. The pinion is operable in a first direction of rotation to move the first rack and the second rack transverse to the axis in opposite directions. The pinion is operable in a second direction of rotation, contrary to the first one, to move the racks in opposite directions towards a second position.

8 Claims, 6 Drawing Sheets

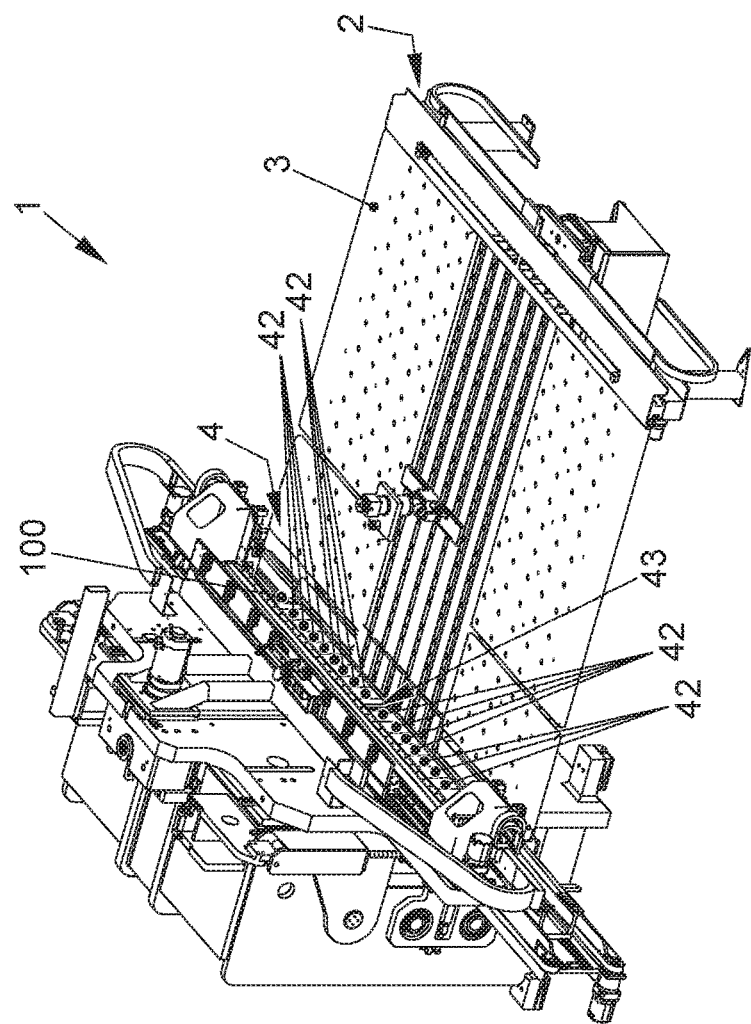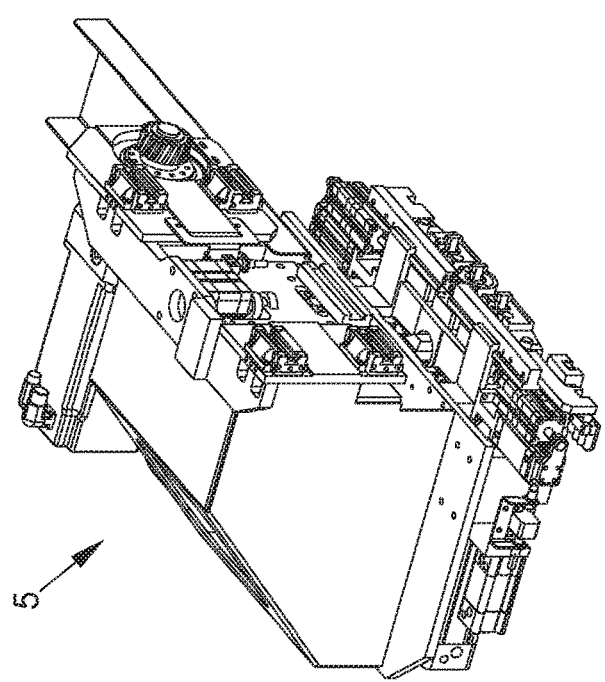
FIG. 13
FIG. 12

ACTUATING DEVICE FOR UPPER SHEET-PRESSING TOOLS OF AN INDUSTRIAL MACHINE FOR THE BENDING OF METAL ELEMENTS

BACKGROUND

The present disclosure relates to an actuating device for upper sheet-pressing tools of an industrial machine for the bending of substantially flat metal elements; and upper sheet-pressing tools for an industrial machine for processing (also known as an automatic bending press or panel bending machine) substantially flat metal elements, such as, typically, panels, sheets, plates and similar, that makes it possible to obtain shaped elements according to a pre-established design, even if they are already partially bent. The present disclosure further relates to a contractible element for bending means of an industrial machine as well as to a method for actuating the contractible element.

SUMMARY

As is known in the art, an industrial machine of the type set out in the present disclosure belongs to a structured and complex automatic plant that, in addition to the bending station comprising the sheet-pressing tools, provides for: the loading of the flat metal element to be bent; the unloading of the same once bent; and a handling assembly that is suitable for moving and rotating the flat metal element to be bent or that has been bent in such a way as to submit it to a processing sequence.

In particular, a typical industrial machine for the bending of flat metal elements includes as its main and essential features: a support frame that rests upon a reference surface (for example, the floor of an industrial plant), and a working plane that is connected to the support frame and accessible to the operator which receives the flat metal element to be bent. The industrial machine further comprises bending means (comprising upper sheet-pressing tools and lower sheet-pressing tools) arranged in front of the working plane and coupled to the support frame, the bending means arranged in order to block the flat metal elements thereby allowing a blade assembly to bend upwards and/or downwards at at least one of the lateral edges of the element.

Additionally, the industrial machine comprises gripping, potentially rotating and feeding means, operationally connected to the working plane and suitable for feeding/moving away the flat metal element to/from the bending means. This generally signifies suction devices, in order to move them according to a horizontal direction or to rotate them in determining the movement thereof in relation to the working plane.

An industrial machine of the aforementioned construction composition succeeds in allowing for the design and efficient execution of a wide variety of bends on the flat metal element. However, when at least one of the perimeter edges of the flat element being processed has already been bent, the upper sheet-pressing tools are not always able to reach the horizontal position on the working plane that would be correct for a subsequent bending operation of another perimeter edge, with the inevitable disadvantageous consequence that most known bending machines are often not suitable for executing further bends of certain types of flat metal elements that have already been bent, up to the point that these further bends are by deduction discarded.

In particular, known contractible elements, which are to be placed at the end of the row of elements that are included in the upper sheet-pressing tools, must be able to come into contact with one side of the sheet even when the two adjacent sides have already been bent.

For this reason, these known contractible elements are able to extend and contract themselves, moving a lower shaped component towards and away from the main body thereof that is apt to come into contact with the flat metal element to be worked. However, the actuating devices which are included in the known contractible elements are extremely complex and voluminous. In fact, the same are required to be housed within an upper component, apt to engage itself with handling devices of the machine, that has a greater volume than that of the comparable fractional and incremental elements that are included in the upper sheet-pressing tools.

This requires complex handling device operations, insofar as the row of elements that constitute the sheet-pressing tools form a discontinuous upper engagement surface.

Embodiments of the present disclosure intend to overcome the disadvantages highlighted in the prior art. In particular, a purpose of embodiments of the present disclosure is that of devising an industrial bending machine that makes it possible to reduce the volume of the contractible elements of the upper sheet-pressing tools. In other words, a purpose of the present disclosure is to provide upper sheet-pressing tools of an industrial machine for the bending of flat metal elements, which are suitable for operating with greater effectiveness and efficiency in relation to those present within equivalent and known machines.

Within the scope of this purpose, one object of the embodiments of the present disclosure is therefore to substantiate an industrial machine for the bending of flat metal elements that makes it possible to meet the requirements of the market more than the prior art.

A second object of embodiments of the present disclosure is to provide an industrial bending machine that may be used for the bending of almost any flat metal element.

A third purpose of embodiments of the present disclosure is to provide an industrial machine for bending flat metal elements that makes it possible to automate the handling operations of the components of upper sheet-pressing tools during use, eliminating vertical movements. Within the scope of this third purpose, the invention has the task of limiting, with respect to the prior art, the interventions of the operator for the moving of components of upper sheet-pressing tools in order to arrange them in the new and correct configuration that precedes a bending operation. Another object of the disclosure is to optimize the management of the human resources related to the operations and management of an industrial machine for the bending of flat metal elements.

Not least, a purpose of embodiments of the present disclosure is to provide an industrial machine that makes it possible to reduce, compared to the state of the art, the costs and timescales for the processing of flat metal elements, such as sheets, plates, panels and the like.

Said purposes are achieved by means of the upper sheet-pressing tool of an industrial machine for the bending of flat metal elements as outlined in the annexed claim 1, to which reference only is made herein for the sake of brevity.

Further detailed technical characteristics of the industrial machine of the present disclosure are contained within the corresponding dependent claims.

Hence, one object of the present disclosure takes the form of an actuating device, for a contractible element for bending means of an industrial machine for bending flat metal elements provided with a lower component and an upper component apt to move relative to each other from a first position to a second position. The actuating device comprises a rack and pinion gear unit and a connecting plate apt to be attached to the lower component. The rack and pinion gear unit comprises a pinion having an axis, at least a first rack and a second rack actuated simultaneously by the pinion so as to pass from a first position to a second position. The first rack is adapted to be fixed to the upper component of the contractible element; the second rack is adapted to be coupled to the connecting plate; the pinion is operable in a first direction of rotation to move the first rack along a first trajectory of translation, transverse to the axis of the pinion and to move the second rack along a second translation trajectory, transverse to the axis of the pinion, such that the first rack and the second rack advance in opposite directions towards the first position thereof.

The pinion is operable in a second direction of rotation contrary to the first direction of rotation, to move the racks in opposite directions towards the second position thereof. According to that which has just been stated, the actuating device contracts, inserts within the already realized folds and then de-contracts, making it possible for the industrial machine 35 to which it is applied, to bend, even with multiple passes of the tool on perimeter edges or separate and differing sections, any flat metal element.

Preferably, according to an embodiment of the present disclosure, the rack and pinion gear unit comprises a third rack, suitable for actuating the pinion, and movable along a third trajectory of translation, transverse 5 to the axis of the pinion and to the first and second translation trajectories. This allows for a convenient and effective operation, working on the third rack, which can be rendered available anywhere on the contractible element to which the device is applied.

Furthermore, according to an embodiment of present disclosure, the third rack has a slot apt to receive an actuator to actuate the movement of the third rack. This increases the ease of access to the third rack, making it possible to use a tool that is compatible with such a slot.

Furthermore, according to an embodiment of present disclosure, thrust means can be included that are coupled to the first rack or to the second rack, to push the first and the second rack in opposite directions and divergent, so as to result spontaneously in the first position thereof.

Thus, advantageously it is possible to provide for a predefined position for the device, according to the convenience and requirements of the manufacturer.

Another object of to an embodiment of present disclosure is a contractible element for bending means of an industrial machine for the bending of flat metal elements, comprising a lower component apt to come into contact with the flat metal element to be bent and an upper component; the lower component and the upper component are apt to move relative to each other from a first position to a second position. The contractible element comprises an actuation device according to the invention, so that when it is actuated, the lower component and the upper component pass from the first position thereof to the second position and vice versa. Equally advantageously, the contractible element makes it possible for the industrial machine for the bending of flat metal elements that comprises it, to meet a broader variety of market requirements more specifically, easily and rapidly than the prior art.

Preferably, according to an embodiment of present disclosure, the upper component can have a first horizontal bore, apt to house the pinion, in communication with a second horizontal bore apt to house the third rack, so that the pinion can be actuated by the third rack.

Advantageously, with the industrial bending machine that implements the contractible element of the present invention, it is possible to thereby effectively automate the handling operations of the components of the upper sheet-pressing tools, thereby limiting the interventions of the operator, who is thus freely and conveniently available for other tasks.

Still further according to an embodiment of present disclosure, the upper element can have a horizontal slot, in communication with the second horizontal bore such as to render the bore accessible, rendering the third rack operable from the outside.

Advantageously, compared to the prior art, an embodiment of the present disclosure reduces the costs and timescales for the processing of particularly critical and complicated flat metal elements (as a function of the weight, size, number and layout of the planned bends thereof).

Another object of an embodiment of the present disclosure is to provide a method for actuating a contractible element for bending means of an industrial machine for bending metal elements provided with a lower component and an upper component configured to move relative to each other from a first position to a second position, wherein the contractible element comprises a rack and pinion gear unit comprising a pinion having an axis, at least a first rack and a second rack, providing the following steps:

a. operating the pinion in a first direction of rotation to move the first rack along a first trajectory of translation, transverse to said axis and to move the second rack along a second trajectory of translation, transverse to said axis, such that the first rack and the second rack advance in opposite directions towards the first position of each of the first rack and the second rack;

b. operating the pinion in a second direction of rotation, contrary to the first direction of rotation, to move the racks in opposite directions towards the second position of each of the first rack and the second rack.

BRIEF DESCRIPTION OF THE DRAWING

The cited purposes and advantages, as well as others which will emerge hereinafter, will become more apparent from the description below which follows, relating to preferred embodiments of the upper sheet-pressing tool of the present disclosure, provided as an illustrative and non-limiting example, with the aid of the accompanying drawing tables, wherein:

FIG. 12 is an axonometric view of the bending machine provided with the contractible element of the invention; and FIG. 13 is an axonometric view of the machine of FIG. 12.

DETAILED DESCRIPTION

Figure 11:
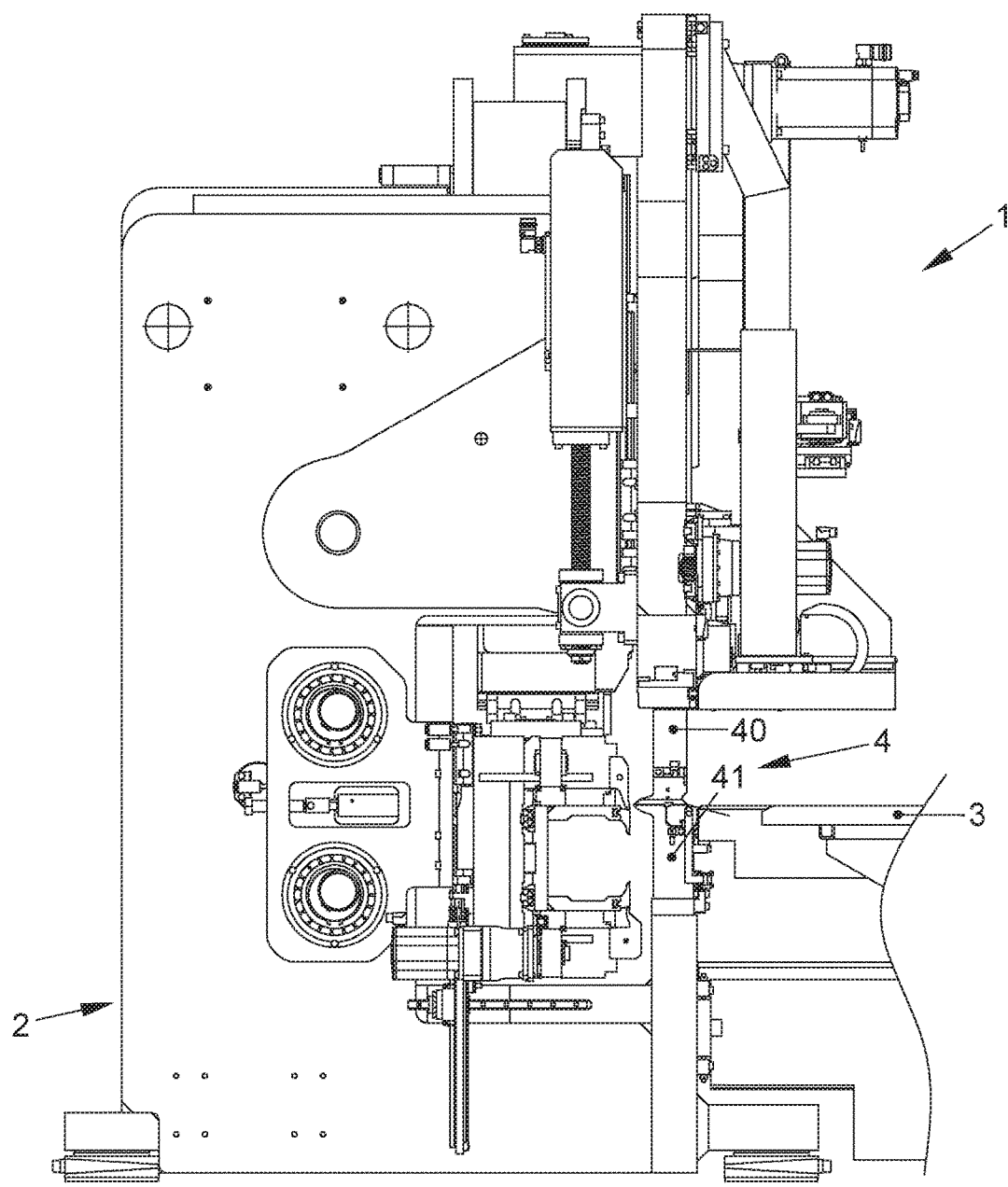
FIG. 11 is an axonometric view of the grabbing and handling means for the machine of embodiments of the present disclosure.

The industrial machine for the bending of flat metal elements, such as for example a plate, is illustrated in FIG. 12 and FIG. 13, wherein it is globally numbered with 1, while FIG. 11 shows a component thereof.

Figure 5:
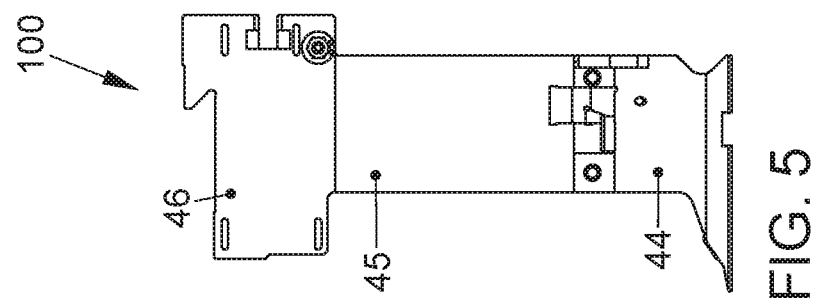
FIG. 5 is a lateral view of the element of FIG. 2.
Figure 4:
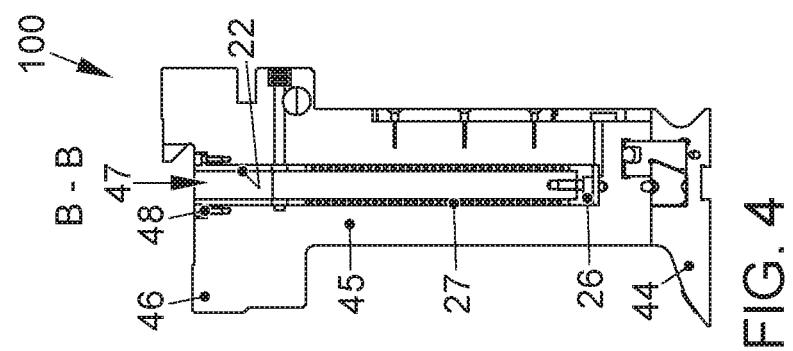
FIG. 4 is a second section of the element of FIG. 2.
Figure 7:
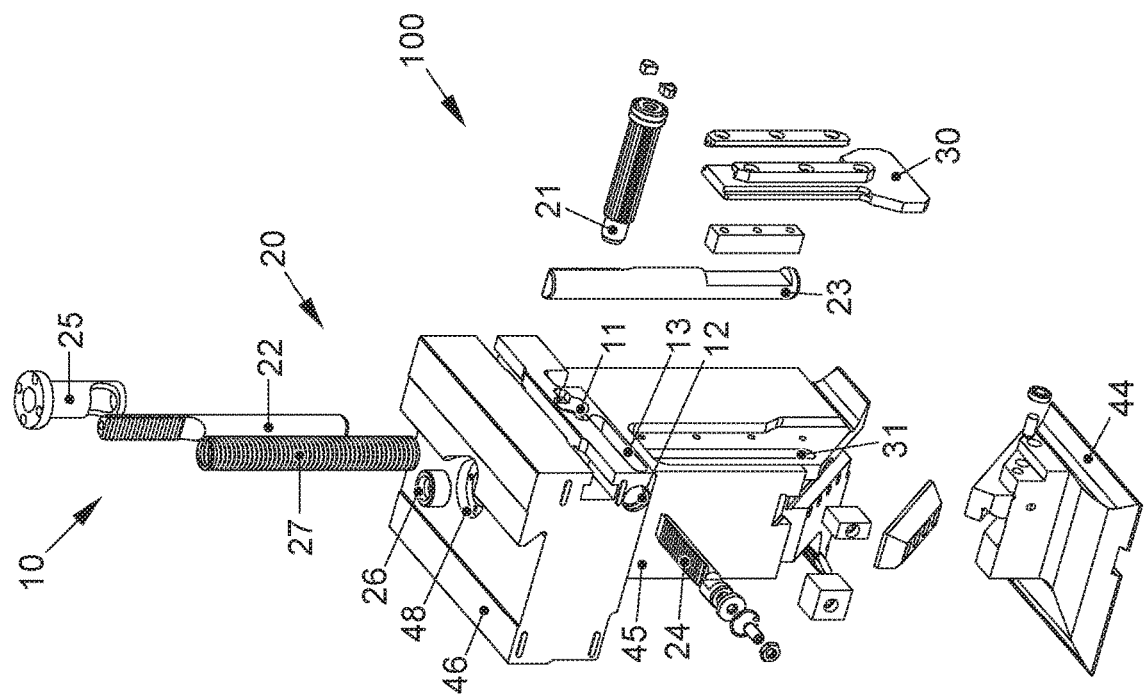
FIG. 7 is an exploded axonometric view of the element of FIG. 1.
Figure 6:
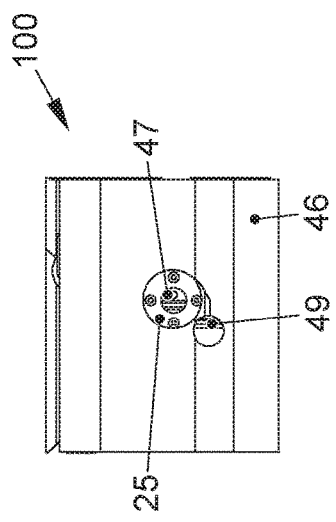
FIG. 6 is a top view of the element of FIG. 1.
Figure 10:
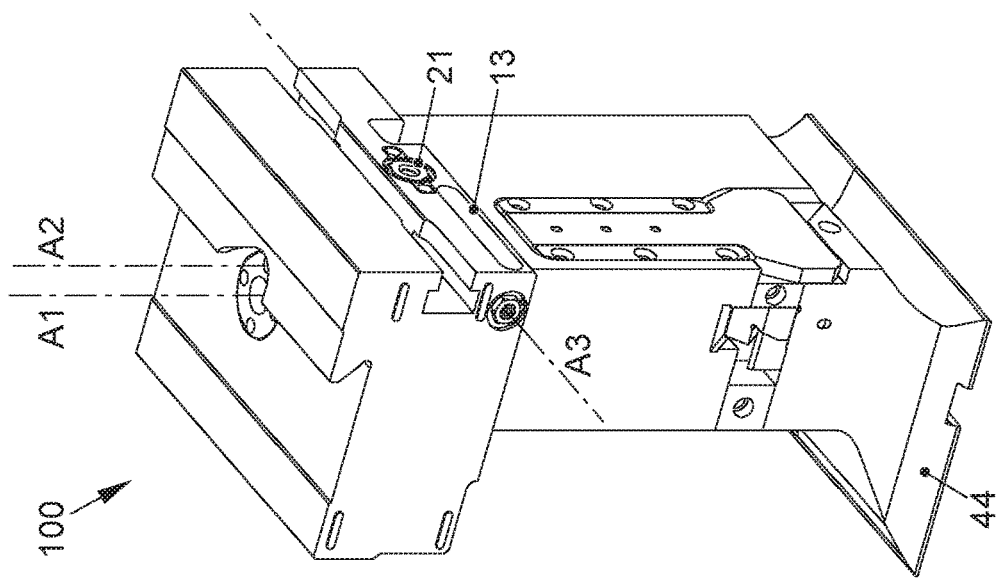
FIG. 10 is an axonometric view of an element of FIG. 2.
Figure 9:
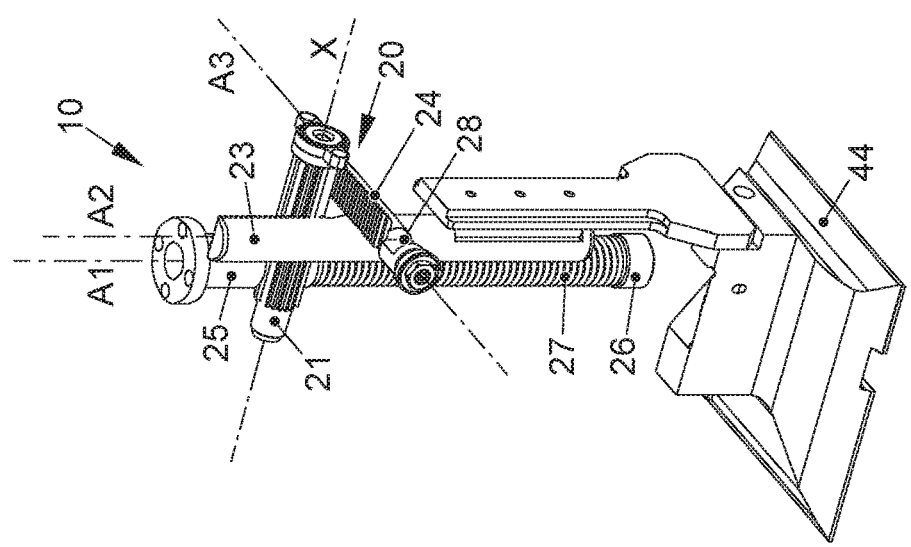
FIG. 9 is a second axonometric view of the actuating device of the invention, removed from the element of FIG. 2.
Figure 8:
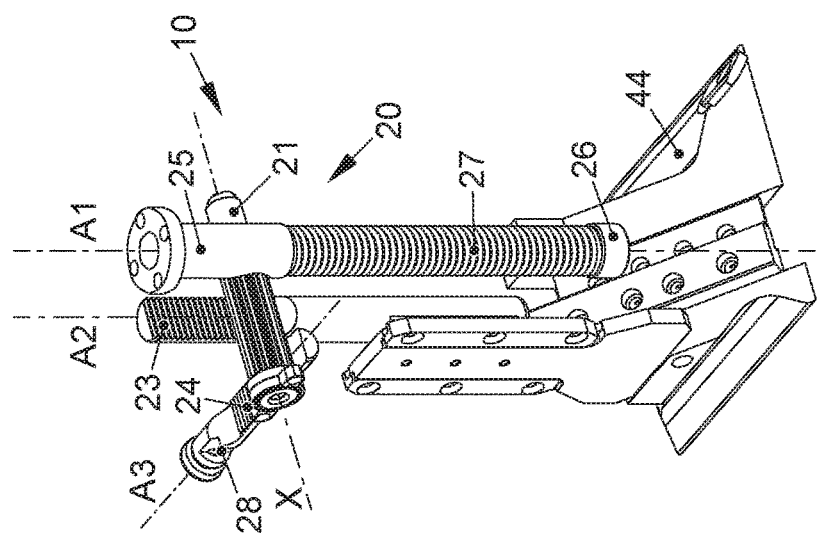
FIG. 8 is a first axonometric view of the actuating device of the invention, removed from the element of FIG. 2.

As can be seen in FIG. 11, the industrial machine 1 comprises: a support structure 2 which rests upon a reference surface, typically the floor of an industrial plant; a working plane 3, connected to the support structure 2 and accessible to the operator, suitable for receiving the flat metal element to be bent; bending means, indicated as a whole with 4, arranged in front of the working plane 3 and coupled to the support structure 2, suitable for bending upwards and/or downwards at least one lateral edge of the flat metal element; and grabbing and handling means 5 (FIG. 5), apt to move and/or grab one or more of the elements that form the bending means 4.

In accordance with the invention, the bending means 4 comprises upper sheet-pressing tools 40, lower sheet-pressing tools 41, and a blade assembly.

The upper sheet-pressing tools 40 have substantially the same vertical section, and comprise fractional elements 42, incremental elements 43 and contractible elements 100.

In FIGS. 1-10 a contractible element 100 is shown, which advantageously, by virtue of the invention has the same volume as the incremental elements 43 and the incremental elements 42, but with a different thickness.

Specifically, in reference to FIGS. 1-10, the contractible elements 100 of the upper sheet-pressing tools 40 have a shaped component 44, apt to come into contact with the flat metal element to be worked, a central body 45 and a second component 46, suitable for engaging with handling devices of the machine 1. This contractible element 100 of the invention has an actuating device 10 comprising: a rack and pinion gear unit 20; and a connecting plate 30 apt to be connected to the shaped block 44.

The rack and pinion gear unit 20 comprising a pinion 21 having an axis X, at least a first rack 22 and a second rack 23. These first and second racks 22, 23 are actuated simultaneously by the pinion 21. The first rack 22 is apt to be fixed to the upper component 46 of the contractible element 100. The second rack 23 is apt to be coupled to the connecting plate 30 and therefore to the shaped component 44.

The first rack 22 is orientated in such a way that, when actuated by the pinion 21, it moves according to a first direction A1 in relation to axis X. The second rack 23, when actuated by the pinion 21, is guided along a second direction A2, opposite the first direction A1. In other words, the first rack 22 and the second rack 23 advance in opposite directions along a direction transverse to axis X, moving the upper component 46 and lower component 44 away from one another, or else bringing them closer to one another.

Specifically, the first rack 22 moves along a first trajectory of translation A1, parallel to the second translation trajectory A2, along which the second rack 23 moves. When the first rack 22 moves away from the lower component 44, the second rack 23 moves away the lower component 44 from the upper component 46, the movement of the lower component 44 being guided by guiding means of the plate 30 according to the prior art, up to a contracting position, while when the first rack 22 moves towards the lower component 44, the second rack 23 moves the lower component 44 towards the upper component 46, up to an extending position, or vice versa.

According to a variant of the invention, shown in FIGS. 1-10, the rack and pinion gear unit 20 comprises a third rack 24, able to actuate the pinion 21, when it moves along a third trajectory of translation A3, transverse to axis X and to the first and second translation trajectories A1, A2.

The upper component 46 is integral to the central body 45 and has a first vertical bore 47 that, as shown in the preferred embodiment of FIGS. 1-10, can have an upper opening 48 for housing attachment means 25.

In any event, this first vertical bore 47 is apt to house the first rack 22. Preferably, therefore, the first rack 22 is rendered integral to the fixing means 25, and in turn to the upper component 44, in such a way that they move together.

Figure 1:
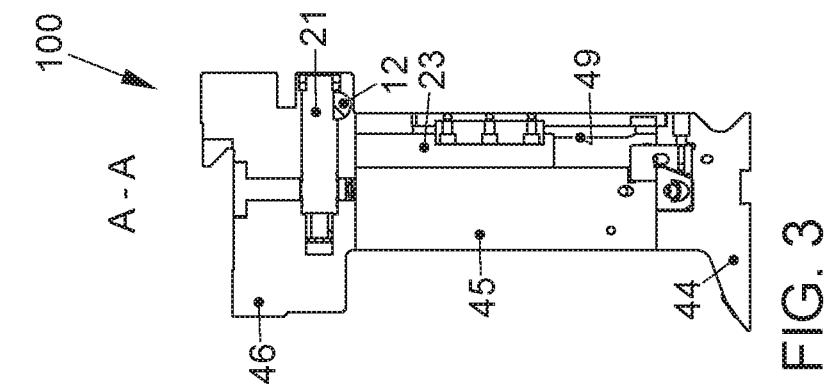
FIG. 1 is a front view of a contractible element of the sheet-pressing tool of the invention, in a first position.
Figure 2:
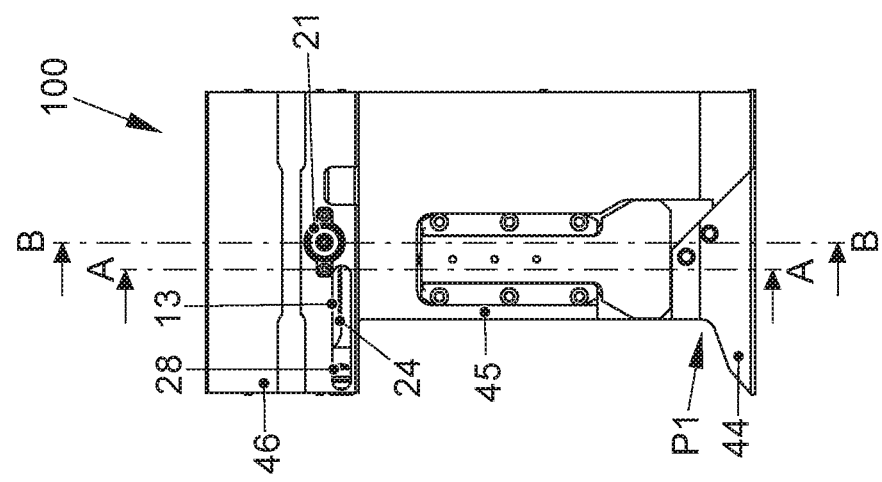
FIG. 2 is a front view of the element of FIG. 1, in a second position.
Figure 3:
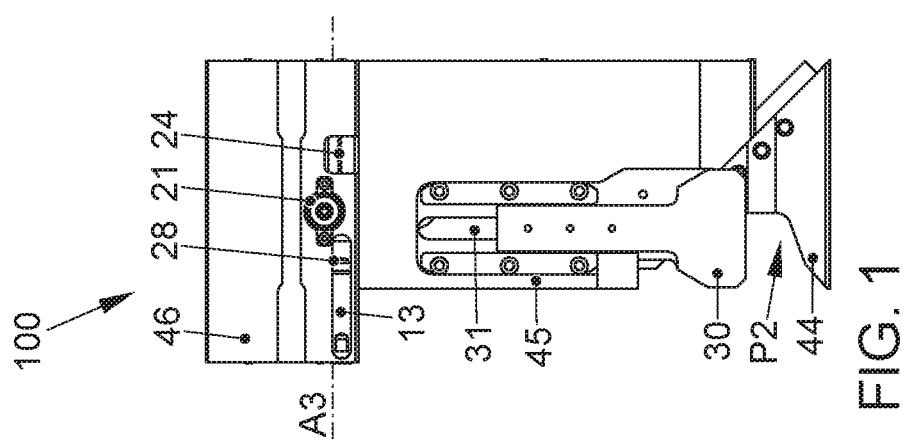
FIG. 3 is a first section of the element of FIG. 2.

Equally preferably, according to the invention, it is possible to provide, coupled to the first rack 22 or to the second rack 23, thrust means 27 (for example: a spiral spring) for pushing the two racks in opposite directions and divergent, so that the contractible element of the invention results spontaneously in the expanded position, as shown in FIG. 2, i.e., with the lower shaped component 44 translated to form a single plane with the lower plane of the central body 45.

In the case wherein the thrust means comprise a spiral spring, as shown in FIGS. 1-10, the first rack 22 has a sealing element 26, apt to receive the thrust of the same spring 27 during the movements of the rack and pinion gear unit 20.

In the operating position, on the other hand, as shown in FIGS. 2-5 and 10, the contractible element applies pressure to the sheet to be bent, and the thrust means expand, with the lower shaped component 44 horizontally translated in relation to the central body 45, in such a way as to obtain a single resting surface on the sheet.

A second vertical bore 49 is apt to house the second rack 23. The first vertical bore 47 has the inlet 48 on the upper horizontal surface of the same upper component 46. The second vertical bore 49 is accessible from the front by means of a vertical slot 31, so as to pass a slide 32, apt to fasten the second rack 23 and the plate 30. In this way, the plate 30 is integral to the second rack 23 and transmits to the shaped component 44 the movement of the same second rack 23, making it possible for it to contract upon itself according to the prior art.

There is also a first horizontal bore 11, apt to house the pinion 21. If necessary, it is also possible to provide for a second horizontal bore 12 apt to house the third rack 24. On the front it is further possible, advantageously, to provide for a horizontal slot 13, at the second horizontal bore 12, such that it is rendered accessible.

In such a case in fact, the third rack 24 can have a slot 28, apt to receive an actuator. When the actuator engages with the slot 28, the actuator can carry out a movement along the axis A3 (or substantially within the slot 13), and therefore actuate the movement of the third rack 24, which in turn actuates the movement of the pinion 21 and consequently of the first and second racks 22 and 23, in order to expand or contract the contractible element 100.

The operation of the industrial machine 1 for the bending of flat metal elements is as follows. The actuators are located at a first insertion position. The contractible elements 100 are in the expanded position, resting upon the surface of the sheet being worked. The bending means 4 have fractional elements 42, incremental elements 43, and contractible elements 100 all arranged with the upper components 46 aligned with one another, in such a way as to have a single surface (FIG. 12). The actuators approach the bending means 4, until one of them is inserted within the slot 13 of a contractible element 100 of the sheet pressing tools 40. When the actuator reaches the slot 28 of the third rack 24, it is possible to carry out a horizontal movement, along the axis A3, translating the third rack 24 and causing the rotation of the pinion 21. At this point, the first rack 22 and the third rack 23 move in opposite directions, overcoming any potential force from the thrust means 27. In this way, the contractible element 100 can be moved avoiding the unwanted expansion thereof. By virtue of the description provided herein, it is understood, therefore, that the industrial machine for the bending of flat metal elements of the invention reaches the objectives and achieves the previously mentioned advantages.

During construction, the industrial machine that is an object embodiment of the present disclosure can be subjected to further modifications with respect to those already highlighted and consisting, for example, of a support frame that is different to that shown in the following figures and only summarily previously described. Furthermore, in other embodiments of the invention, not shown hereinafter, the actuation means may be of a different typology to that indicated during the course of the preceding descriptive text. In addition, further embodiments of the industrial machine 5 claimed herein, not shown, may include gripping and feeder means other than those upon which the description of the preferred embodiment of the invention was based, which does not invalidate the main and innovative advantages involved in the latter. In addition, the movable working plane of the industrial machine of embodiments of the present disclosure can assume another construction composition in other construction variants of the invention, not yet shown.

Other embodiments of the industrial machine of the embodiments of the present invention, not yet shown in the enclosed drawings, may provide for the actuation means to move the gripping and feeder means according to only one vertical direction or else only one horizontal direction in order to determine the displacement thereof with respect to the working plane.

Finally, alternative embodiments of the invention can be possible, not shown in the enclosed drawings, wherein the bending means of the flat metal element have a different composition from that obtainable from such designs.

It is clear, finally, that numerous other variants may be applied to the industrial machine under examination, without departing from the principles of novelty that are inherent to the inventive idea expressed herein, as it is also clear that, in the practical embodiment of the invention, the materials, shapes and dimensions of the details illustrated can be any, depending upon the requirements, and can be replaced with others that are technically equivalent.

Where the construction characteristics and techniques mentioned in the subsequent claims are followed by markings or reference numbers, these markings were introduced with the sole purpose of increasing the intelligibility of the claims and, consequently, they do not have a limiting effect upon the interpretation of each element identified, purely by way of example, by such reference markings.

The invention claimed is:

1. An actuating device configured to actuate a contractible element of a bending means of an industrial machine for bending metal elements provided with a lower component and an upper component apt to move relative to each other from a first position to a second position, the actuation device comprising:
   a rack and pinion gear unit;
   a connecting plate configured to be connected to the lower component of said contractible element;
   said rack and pinion gear unit comprising a pinion having an axis, at least a first rack and a second rack, said first rack and said second rack are actuated simultaneously by said pinion so as to pass from a first position to a second position;
   said first rack being configured to be fixed to the upper component of said contractible element;
   the second rack being configured to be coupled to the connecting plate;
   said pinion being operable in a first direction of rotation to move the first rack along a first trajectory of translation, transverse to said axis and to move said second rack along a second trajectory of translation, transverse to said axis, such that said first rack and said second rack advance in opposite directions towards the first position of each of said first rack and said second rack;
   said pinion being operable in a second direction of rotation, contrary to said first direction of rotation, to move said racks in opposite directions towards the second position of each of said first rack and said second rack.

2. The actuating device according to claim 1, wherein said rack unit comprises a third rack suitable for actuating said pinion and movable along a third trajectory of translation transverse to said axis and to said first and second translation trajectories.

3. The actuation device according to claim 2, wherein the third rack comprises a slot for receiving an actuator to actuate the movement of the third rack.

4. The actuating device according to claim 1, further comprising thrust means coupled to said first rack or to said second rack and arranged to push said first and second rack in opposite directions and divergent so as to land spontaneously in the first position.

5. A contractible element for bending means of an industrial machine for bending flat metal elements, said contractible element comprising:
   a lower component;
   an upper component;
   the lower component configured to contact a flat metal element to be bent;
   the lower component and the upper component configured to move relative to each other from a first position to a second position,
   an actuating device configured to actuate a contractible element of a bending means of an industrial machine for bending metal elements provided with a lower component and an upper component apt to move relative to each other from a first position to a second position, the actuation device comprising:
   a rack and pinion gear unit;
   a connecting plate configured to be connected to the lower component of said contractible element;
   said rack and pinion gear unit comprising a pinion having an axis, at least a first rack and a second rack, said first rack and said second rack are actuated simultaneously by said pinion so as to pass from a first position to a second position;
   said first rack being configured to be fixed to the upper component of said contractible element;

the second rack being configured to be coupled to the connecting plate;

said pinion being operable in a first direction of rotation to move the first rack along a first trajectory of translation, transverse to said axis and to move said second rack along a second trajectory of translation, transverse to said axis, such that said first rack and said second rack advance in opposite directions towards the first position of each of said first rack and said second rack;

said pinion being operable in a second direction of rotation, contrary to said first direction of rotation, to move said racks in opposite directions towards the second position of each of said first rack and said second rack, wherein said first rack is configured to be fixed to the upper component of said contractible element;

wherein the second rack is configured to be coupled to the connecting plate;

wherein said pinion is operable in a first direction of rotation to move the first rack along a first trajectory of translation, transverse to said axis and to move said second rack along a second trajectory of translation, transverse to said axis, such that said first rack and said second rack advance in opposite directions towards the first position of each of said first rack and said second rack; and wherein said pinion being operable in a second direction of rotation, contrary to said first direction of rotation, to move said racks in opposite directions towards the second position of each of said first rack and said second rack; and wherein when said actuating device is operated, said lower component and said upper component pass from the first position to the second position and vice versa.

6. The contractible element according to claim 5, wherein said upper component has a first horizontal bore for housing said pinion in combination with a second horizontal bore for housing said third rack, such that said pinion can be actuated by said third rack.

7. The contractible element according to claim 5, wherein said upper component further comprises a horizontal slot arranged in communication with said second horizontal bore and configured to render the second horizontal bore externally accessible and said third rack externally operable.

8. A method for actuating a contractible element for bending means of an industrial machine for bending metal elements, the industrial machine provided with a lower component and an upper component configured to move relative to each other from a first position to a second position, wherein the contractible element comprises a rack and pinion gear unit comprising a pinion having an axis, at least a first rack and a second rack, the method comprising the steps of:

operating said pinion in a first direction of rotation to move the first rack along a first trajectory of translation, transverse to said axis and to move said second rack along a second trajectory of translation, transverse to said axis, such that said first rack and said second rack advance in opposite directions towards the first position of each of said first rack and said second rack; and operating said pinion in a second direction of rotation, contrary to said first direction of rotation, to move said racks in opposite directions towards the second position of each of said first rack and said second rack.

* * * * *